(12) United States Patent
Vernekar et al.

(10) Patent No.: US 7,244,777 B2
(45) Date of Patent: Jul. 17, 2007

(54) NUCLEATED POLYOLEFINS AND PREPARATION THEREOF

(75) Inventors: Subhash Pundlik Vernekar, Pune (IN); Ramesh Chellaswamy, Pune (IN); Swaminathan Sivaram, Pune (IN)

(73) Assignee: Council of Scientific and Industrial Research, New Delhi (IN)

( * ) Notice: Subject to any disclaimer, the term of this patent is extended or adjusted under 35 U.S.C. 154(b) by 494 days.

(21) Appl. No.: 10/810,337

(22) Filed: Mar. 26, 2004

(65) Prior Publication Data

US 2005/0215681 A1    Sep. 29, 2005

(51) Int. Cl.
*C08K 5/05*   (2006.01)
*C08K 5/098*  (2006.01)

(52) U.S. Cl. ............ 524/380; 524/379; 524/381; 524/383; 524/570; 524/583; 524/585

(58) Field of Classification Search ............ 524/381
See application file for complete search history.

(56) References Cited

U.S. PATENT DOCUMENTS 3,207,737 A    9/1965   Wales
3,207,739 A    9/1965   Wales

FOREIGN PATENT DOCUMENTS

WO    WO-98/29494 A1    7/1998

OTHER PUBLICATIONS

Hans Domininghaus, "Die Kunststoffe und ihre Eigenshaften", 1998 Springer, Berlin, XP002291630, pp. 55-56.

*Primary Examiner*—Vasu Jagannathan
*Assistant Examiner*—Vickey Ronesi
(74) *Attorney, Agent, or Firm*—Darby & Darby

(57) ABSTRACT

The present invention provides nucleated polyolefins using shellac based nucleating agents wherein the nucleated polyolefins obtained have improved crystallization temperature (Tc) and smaller spherulitic size and hence improved transparency characteristics.

9 Claims, No Drawings

NUCLEATED POLYOLEFINS AND PREPARATION THEREOF

FIELD OF THE INVENTION

The present invention relates to nucleated polyolefins and a process for the preparation thereof. More particularly the present invention provides nucleated polyolefins using shellac based nucleating agents. The polyolefins provided by the present invention have improved crystallization temperature (Tc) and smaller spherulitic size and hence improved transparency characteristics. The polyolefin comprises a polymer selected from aliphatic polyolefins (PO) and copylomers containing at least one aliphatic olefin and one or more ethylenically unsaturated aliphatic comonomers and alkali/alkaline earth metal salts of aleuritic acid/shelloic acid, which are constituents of naturally occurring shellac alone or in combination with aliphatic fatty acids or its salts in an amount sufficient to improve crystallization temperature, reduce spherulitic size and hence improve transparency.

BACKGROUND OF THE INVENTION

It is well known that incorporation of a nucleating agent (NA) in semicrystalline thermoplastic polymers such as polyolefins (PO) increases crystallization temperature, reduces spherulitic size and improves clarity and mechanical properties of the polymer. Generally, nucleating agents are high melting compounds which do not melt at processing temperature of the polymer and remain as discrete particles embedded in polymer melt. These insoluble particles behave as nucleator for the crystallization of polymer melt and generate innumerable crystallization sites resulting innumerous small spherulites some nucleating agents are soluble in polymer melt but they solidify before crystallizatin of polymer melt and, thus, generate sites for crystallization. Addition of nucleating agents in polyolefins reduces the size of spherulites and improves clarity. It also enhances mechanical properties, increases crystallization temperature and reduces cycle time for injection moulding process.

A large variety of both organic and inorganic compounds have been used as nucleating agents. Most widely used nucleating agents are benzylidene derivatives of sorbitols, metal salts of organic carboxylic and sulfonic acids and phosphate salts. Of these nucleating agents, sorbitol derivatives are highly effective in improving transparency. However, use of sorbitol derivatives is not preferred in extrusion because, it tends to sublime during extrusion causing contamination of equipment parts and it gives odor. Moreover, they are very expensive. Hence the metal salts or organic acids, though less effective, are preferred in many application. Metallic salts of carboxylic acid belong to non-soluble category of nucleating agents. Sodium benzoate is the example of nucleating of nucleating agent belonging to metal salt of carboxylic acid class.

Metal salts of different mono, di and poly carboxylic aliphatic, substituted and un substituted aromatic acids, carboxylic acids containing cyclic and fused rings with alkali/alkaline earth metal belonging to IA, IIA and IIIA group in periodic table have been used. U.S. Pat. Nos. 5,912,292, and 3,852,237 describe the use of sodium benzoate as nucleating agent. U.S. Pat. Nos. 5,714,531 and 5,998,576 describe the use of rosin acid salts as nucleating agents. Rosin is naturally occurring material containing mixtures of acids such as abietic acid, dehydroabietic acid and many other acids. Metallic salts of dehydorabietic acid are reported to be effective nucleating agents. Shellac is another naturally occurring compound containing many carboxylic acids. However, it is not used as nucleating agent.

Shellac is resinous material obtained from insects. It is composed of mainly hydroxy fatty acids like aleuritic acid, butolic acid and other mono and id hydroxy acids along with hydroxy terpenic acids like jalaric acid, shelloic acid and laksholic acids. Aleuritic acid and jalaric acid and/shelloic acid are the major constituents of shellac. Jalaric acid is easily converted to shelloic acid. Aleuritic acid having formula (1)

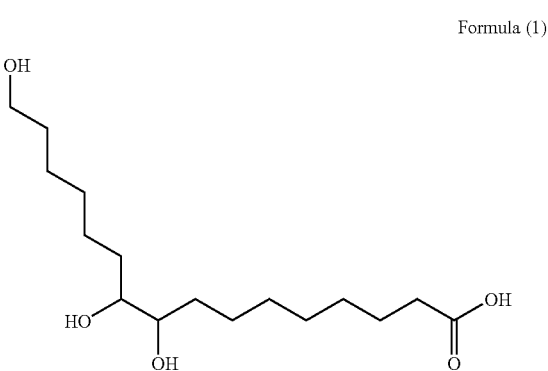

Formula (1)

is a monobasic acid containing three hydroxyl groups whereas shelloic acid of formula (2)

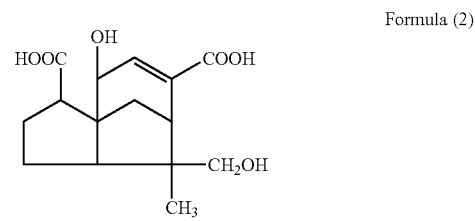

Formula (2)

is a hydroxy terpenic acid having fused ring system. Salts of carboxylic acid containing fused ring system have low volatility.

OBJECTS OF THE INVENTION

The main object of this invention is to provide nucleated polyolifins and a process for preparation thereof utilizing shellac a naturally occurring material containing compound of formula (1) and formula (2), as nucleating agent for semi-crystalline homo and copolymers.

SUMMARY OF THE INVENTION

Accordingly, present invention provides nucleated polyolefins having alkali and alkaline earth metal salts of aleuritic acid of formula 1 and shelloic acid of formula 2 present therein as the nucleating agent

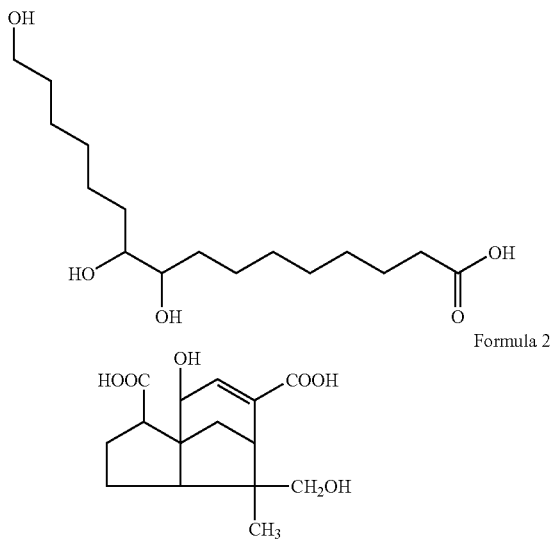

Formula 1

Formula 2

The present invention also provides a process for the preparation of a nucleated polyloefin comprising mixing a polyolefin with a nucleating agent selected from the group consisting of alkali and alkaline earth metal salts of aleuritic acid of formula 1 and shelloic acid of formula 2 or a mixture thereof and extruding the mixture at minimum temperature of melting point of the polyolefin to obtain the nucleate polyolefin.

In one embodiment of the invention the polyolefin is selected from the group consisting of polyolefin polymers of an aliphatic olefin and copolymers containing at least one aliphatic olefin and one or more ethylenically unsaturated comonomers.

In another embodiment of the invention, the comonomer is present in an amount of 10% or less based on the weight of olefin.

In another embodiment of the invention, the polyolefin polymer comprises polymers and copolymers of aliphatic mono olefins containing two to six carbon atoms having molecular weight of about 30,00,000 to about 5,00,000 preferably from 30,000 to about 3,00,000 such as polyethylene, polypropylene, ethylene-propylene copolymers.

In another embodiment of the invention, the nucleating agent is obtained by neutralizing the aleuritic and shelloic acids with an alkali metal hydroxide followed by removal of water under reduced pressure at a temperature of about 80° C. followed by further drying at about 120° C. under reduced pressure.

In another embodiment of the invention, the nucleating agent is prepared by treating neutral aqueous solution of alkali salts of aleuritic and shelloic acids with a equimolar solutions of alkaline earth chlorides, washing the precipitated salts with water and drying at 1200° C. under reduced pressure and isolating the water soluble salts by removal of water and grinding the salts in mortar and pestle.

In another embodiment of the invention, the metal salt comprises a salt of sodium, potassium, lithium, calcium and aluminum.

DETAILED DESCRIPTION OF THE INVENTION

The object of this invention is to prepare alkali and alkaline earth metal salts of two major constituents of shellac namely, hydroxyl group containing aliphatic aleurite acid and shelloic acid having fused ring system. Another object of this invention is to utilize these salts as nucleating agent for polyolefins as a class and polypropylene in particular.

The present invention provides nucleated polyolefins having alkali and alkaline earth metal salts of aleuritic of formula 1 and shelloic acids of formula 2 present as nucleating agent. The present invention also provides a process for the preparation of the nucleated polyloefins, using the nucleating agent having alkali and alkaline earth metal salts of aleuritic acid of formula 1 and shelloic acid of formula 2 present as nucleating agent. The process comprises mixing the polyolefin with the nucleating agent and optionally in combination with other additives such as antiodants, antislip agents, acid scavengers, lubricants or UV absorbers and extruding the mixture at minimum temperature of melting point of the polyolefin to obtain the nucleate polyolefin.

The polyolefin polymer used for the nucleated polyolefin includes polyolefin polymers of the aliphatic olefins and copolymers containing at least one aliphatic olefin and one or more ethylenically unsaturated comonomers. The comonomer if present is provided in minor quantities about 10% or even lower percent based on the weight of olefin. Such comonomers are provided to modify the properties of polymers.

Examples of the polymers whose transparency can be improved by incorporation of nucleating agent include polymer and copolymers of aliphatic mono olefins containing tow to about six carbon atoms having molecular weight of about 30,00,000 to about 5,00,000 preferably from 30,000 to about 3,00,000 such as polyethylene, polypropylene, ethylene-propylene copolymers.

In yet another feature the salts are prepared by a method, for example but not restricted to, by neutralizing the aleuritic and shelloic acids with an alkali metal hydroxides followed by removal of water under reduced pressure at, but not restrict to, 80° C. followed by further drying at ~120° C. under reduced pressure. The alkaline earth metal salts are prepared by treating neutral aqueous solution of alkali salts of aleuritic and shelloic acids with a equimolar solutions of alkaline earth chlorides. Precipitated salts are washed with water and dried at 1200 c under reduced pressure. Water soluble salts are isolated by removal of water as described in preparation of alkali salt. All the salts are further ground in a pestle and mortar or pulverized by suitable method before use.

The following examples are given by way of illustration and should not be constrained to limit the scope of the present invention.

EXAMPLE 1

Preparation of potassium salt of aleuritic acid: in a 25 ml round bottom flask, aleuritic acid (0.5 g) was taken. To it was added aqueous solution of potassium hydroxide (0.092 g in 4 ml water). The solution was stirred well for 1 h, and water was removed from the solution under reduced pressure at ~80° C. The solid obtained was dried at high vacuum at 120° C.

The resulting potassium salt of aleuritic acid showed a melting point of 180° C. the solid was pulverized in a pestle mortar. 0.2 g above salt was mixed with 100 g of polypropylene resin and compounded along with other additives namely, Irganox 1010, 500 ppm; Ultranox-626, 800 ppm; Hydrotalcite DHT 4A, 200 ppm; Calcium stearate, 500 ppm; GMS-Finast 9500, 400 ppm on a Brabander single screw extruder. The extrusion temperature profile was 170-180-200-210° C. the screw RPM was 60 the residence time was 30 seconds. The extruded crystallization temperature (Tc). Crystallization temperature (Tc) values of these samples are given in Table-1.

Crystallization temperature was determined by DSC. The sample was heated to 210° C. and held at that temperature for 2 minutes. After this holding period, the sample was cooled to 50° C. at a rate of 10° C. per minute. From the exotherm, the onset of crystallization and peak crystallization temperature were determined.

The spherulite size of the samples was determined by optical mocroscope. A thin film of the sample was sandwhiched between two glass slides and kept in the hot stage attached to the microscope. The sample was heated to 210° C. and held at that temperature for 2 minutes. After this holding period, the sample was cooled to 50° C. at a rate 10° C. per minute. During cooling the sample crystallized and spherulitic morphology could be observed through the microscope. The spherulite size was measured by the micrometer in the eye piece.

EXAMPLE 2

Preparation of aluminum salt of aleuritic acid: in a 25 ml round bottom flask, aleuritic acid (1.0 g) was taken. A solution of sodium hydroxide (0.1315 g dissolved in 4 ml water) was added to it. Aluminum chloride solution (0.145 g dissolved in 1.5 ml water) was added drop wise to the above solution with vigorous stirring. The precipitate formed was filtered, washed with water and dried at 120° C. under reduced pressure. The solid was pulverized in a pestle mortar.

The sample (0.2 g) of above salt was mixed with 100 g opf polypropylene resin and compounded along with other additives namely, Irganox 1010, 500 ppm; Ultranox-626, 800 ppm; Hydrotalcite DHT 4A, 200 ppm; Calcium stearate, 500 ppm; GMS-Finast 9500, 400 ppm on a Brabander single screw extruder. The extrusion temperature profile was 170-180-200-210° C. the screw RPM was 60. The residence time was 30 seconds. The extruded material was palletized and analyzed by DSC FOR determining crystallization temperature (Tc). Crystallization temperature (Tc) values of these samples are given in Table-1.

Crystallization temperature was determined by DSC. The sample was heated to 210° C. and held at that temperature for 2 minutes. After this holding period, the sample was cooled to 50° C. at a rate of 10° C. per minute. From the exotherm, the onset of crystallization and peak crystallization temperature were determined.

The spherulite size of the samples was determined by optical microscope. A thin film of the sample was sandwiched between two glass slides and kept in the hot stage attached to the microscope. The sample was heated to 210° C. and held at that temperature for 2 minutes. After this holding period, the sample was cooled to 50° C. at a rate of 10° C. per minute. During cooling the sample crystallized and spherulitic morphology could be observed through the microscope. The spherulite size was measured by the micrometer in the eye piece.

EXAMPLE 3

Preparation of calcium salt of aleuritic acid: In a 25 ml round bottom flask, aleuritic acid (0.5 g) was taken. To it aqueous sodium hydroxide (0.065 g in 4 ml water). solution was added to it drop wise with vigorous stirring to precipitate calcium salt. The salt was filtered, washed with water and dried at 120° C. under reduced pressure: The resulting calcium salt of aleuritic acid showed a melting point of 155° C. The solid was pulverized in a pestle mortar.

(0.2 g) of above salt was mixed with 100 g of polypropylene resin and compounded along with other additives namely, Irganox 1010, 500 ppm; Ultranox-626, 800 ppm; Hydrotalcite DHT 4A, 200 ppm; Calcium stearate, 500 ppm; GMS-Finast 9500, 400 ppm on a Brabander single screw extruder. The extrusion temperature profile was 170-180-200-210° C. The screw RPM was 60. The residence time was 30 seconds. The extruded material was palletized and analyzed by DSC FOR determining crystallization temperature (Tc). Crytallization temperature (Tc) values of these samples are given in Table 1. A thin film of the sample was sandwiched between two glass slides and kept in the hot stage attached to the microscope. The sample was heated to 210° C. and held at that temperature for 2 minutes. After this holding period, the sample was cooled to 50° C. at a rate of 10° C. per minute. During cooling the sample crystallized and spherulitic morphology could be observed through the microscope. The spherulite size was measured by the micrometer in the eye piece.

EXAMPLE 4

Preparation of magnesium salt of aleuritic acid: In a 25 ml round bottom flask, aleuritic acid (0.5 g) was dissolved in aqueous solution of sodium hydroxide (0.065 g in 4 ml water). Magnesium chloride solution (0.0783 g dissolved in 1:5 mL water) was added to it drop wise with vigorous stirring to precipitate magnesium salt. The salt was filtered, washed with water and dried at 120° C. under reduced pressure. The melting point resulting magnesium salt of aleuritic acid is above 180° C. The solid was pulverized in a pestle mortar.

0.2 g of above salt was mixed with 100 g of polypropylene resin and compounded along with other additives namely, Irganox 1010, 500 ppm; Ultranox-626, 800 ppm; Hydrotalcite DHT 4A, 200 ppm; Calcium stearate, 500 ppm; GMS-Finast 9500, 400 ppm on a Brabander single screw extruder. The extrusion temperature profile was 170-180-200-210° C. The screw RPM was 60. The residence time was 30 seconds. The extruded material was palletized and analyzed by DSC FOR determining crystallization temperature (Tc). Crystallization temperature (Tc) values of these samples are given in Table-1.

Crystallization temperature wad determined by DSC. The sample was heated to 210° C. and held at that temperature for 2 minutes. After this holding period, the sample was cooled to 50° C. at a rate of 10° C. per minute. From the exotherm, the onset of crystallization and peak crystallization temperature were determined.

The spheulite size of the samples was determined by optical microscope. A thin film of the sample was sandwiched between two glass slides and kept in the hot stage attached to the microscope. The sample was heated to 210° C. and held at that temperature for 2 minutes. After this holding period, the sample was cooled to 50° C. at a rate of 10° C. per minute. During cooling the sample crystallized and spherulitic morphology could be observed through the microscope. The spherulite size was measured by the micrometer in the eye piece.

EXAMPLE 5

Preparation of magnesium salt of shelloic acid: In a 25 ml round bottom flask, shelloic acid (0.2 g) was dissolved in alcoholic potassium hydroxide (0.076 g in 2 ml water) solution. Aqueous solution Magnesium chloride (0.06 g dissolved in 1.0 mL water) was added drop wise to above solution with vigorous stirring. Alcohol and water was distilled off under reduced pressure. The salt was dried under reduced pressure at 120° C. (m.p. >210° C.). The solid was pulverized in a pestle mortar.

0.2 g of above salt was mixed with 100 g of polypropylene resin and compounded along with other additives namely, Irganox 1010, 500 ppm; Ultranox-626, 800 ppm; Hydrotalcite DHT 4A, 200 ppm; Calcium stearate, 500 ppm; GMS-Finast 9500, 400 ppm on a Brabander single screw extruder. The extrusion temperature profile was 170-180-200-210° C. The screw RPM was 60. The residence time was 30 seconds. The extruded material was palletized and analyzed by DSC for determining crystallization temperature (Tc). Crystallization temperature (Tc) values of these samples are given in Table-1.

Crystallization temperature was determined by DSC. The sample was heated to 210° C. and held at the temperature for 2 minutes. After this holding period, the sample was cooled to 50° C. at a rate of 10° C. per minute. From the exotherm, the onset of crystallization and peak crystallization temperature were determined.

The spherulite size of the sample was determined by optical microscope. A thin film of the sample was sandwiched between two glass slides and kept in the hot stage attached to the microscope. The sample was heated to 210° C. and held at the temperature for 2 minutes. During cooling the sample crystallized and spherulitic morphology could be observed through the microscope. The spherulite size was measured by the micrometer in the eye piece.

EXAMPLE 6

Preparation of calcium salt of shelloic acid: In a 25 ml round bottom flask, shelloic acid (0.2 g) was dissolve in aqueous sodium hydroxide (0.0541 g in 4 ml water) solution. A solution of calcium chloride (0.075 g dissolved in 1.5 mL water) was added to it drop wise with vigorous stirring. Water was distilled off from the solution under reduced pressure at 80° C. The salt was dried at 120° C. under reduced pressure the melting point resulting calcium salt of shelloic acid is above 261° C. the solid was pulverized in a pestle mortar.

The sample (0.2 g) of above salt was mixed with 100 g of polypropylene resin and compounded along with other additives namely, Irganox 1010, 500 ppm; Ultranox-626, 800 ppm; Hydrotalcite DHT 4A, 200 ppm; Calcium stearate, 500 ppm; GMS-Finast 9500, 400 ppm on a Brabander single screw extruder. The extrusion temperature profile was 170-180-200-210° C. The screw RPM was 60. The residence time was 30 seconds. The extruded material was palletized and analyzed by DSC for determining crystallization temperature (Tc). Crystallization temperature (Tc) values of these samples are given in Table-1.

Crystallization temperature was determined by DSC. The sample wad heated to 210° C. and held at that temperature for 2 minutes. After this holding period, the sample was cooled to 50° C. at a rate of 10° C. per minute. From the exotherm, the onset of crystallization and peak crystallization temperature were determined.

The spherulite size of the samples was determined by optical microscope. A thin film of the sample was sandwiched between two glass slides and kept in the hot stage attached to the microscope. The sample was heated to 210° C. and held at that temperature for 2 minutes. After this holding period, the sample was cooled to 50° C. at a rate of 10° C. per minute. During cooling the sample crystallized and spherulitic morphology could be observed through the microscope. The spherulite size was measured by the micrometer in the eye piece.

COMPARATIVE EXAMPLE 7

Preparation of potassium salt of dehydroabietic acid: In a clean 50 ml round bottom flask was taken dehydroabietic acid (1.0 g). It was dissolved in ethanol (5 ml). The acid was neutralized with ethanolic potassium hydroxide solution. The solution was stirred for 1 hour. Then the solvent was removed under vacuum maintaining temperature around 100° C.

After drying, the solid was ground in mortar to a fine powder. The resulting potassium salt of dehydroabeitic acid showed a melting point above 235° C. The solid was pulverized in a pestle mortar.

0.2 g of above salt was mixed with 100 g of polypropylene resin and compounded along with other additives namely, Irganox 1010, 500 ppm; Ultranox-626, 800 ppm; Hydrotalcite DHT 4A, 200 ppm; Calcium stearate, 500 ppm; GMS-Finast 9500, 400 ppm on a Brabander single screw extruder. The extrusion temperature profile was 170-180-200-210° C. The screw RPM was 60. The residence time was 30 seconds. The extruded material was palletized and analyzed by DSC for determining crystallization temperature (Tc). Crystallization temperature (Tc) values of these samples are given in Table-1.

Crystallization temperature was determined by DSC. The sample was heated to 210° C. and held at that temperature for 2 minutes. After this holding period, the sample was cooled to 50° C. at a rate of 10° C. per minute. Form the exotherm, the onset of crystallization and peak crystallization temperature were determined.

The spherulite size of the samples was determined by optical microscope. A thin film of the sample was sandwiched between two glass slides and kept in the hot stage attached to the microscope. The sample was heated to 210° C. and held at that temperature for 2 minutes. After this holding period, the sample was cooled to 50° C. at a rate of 10° C. per minute. During cooling the sample crystallized and spherulitic morphology could be observed through the microscope. The spherulite size was measured by the micrometer in the eye piece.

The main advantage of the present invention is significant improvement in crystallization temperature (Tc) and reduction in spherulitic size of crystals of polyonefins thus, improving optical properties by using a salt of an acid namely, shelloic acid based on shellac, a naturally occurring indigenous material.

TABLE 1

| No. | Examples | Tc (° C.) | Tc onset (° C.) | Spherulite |
|-----|----------|-----------|-----------------|------------|
| 1. | Example-1 | 101 | 107 | 25 |
| 2. | Example-2 | 105 | 112 | — |
| 3. | Example-3 | — | — | — |
| 4. | Example-4 | — | — | — |
| 5. | Example-5 | 102 | 111 | — |
| 6. | Example-6 | 108 | 113 | 14 |
| 8. | Comparative example-7 | 105 | 105 | 50 |

We claim:

1. A nucleated polyolefin having a nucleating agent selected from alkali or alkaline earth metal salts of aleuritic acid of Formula 1

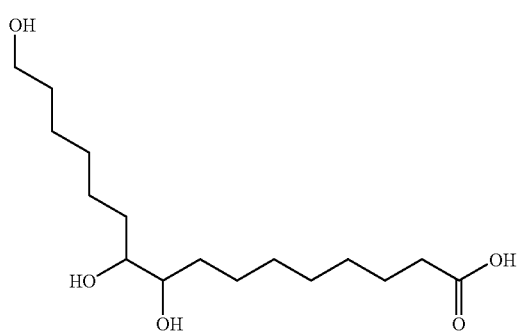

Formula (1)

or shelloic acid of Formula 2

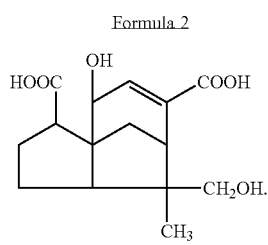

Formula 2

2. A process for the preparation of a nucleated polyolefin comprising mixing a polyolefin with a nucleating agent selected from alkali or alkaline earth metal salts of aleuritic acid of Formula 1

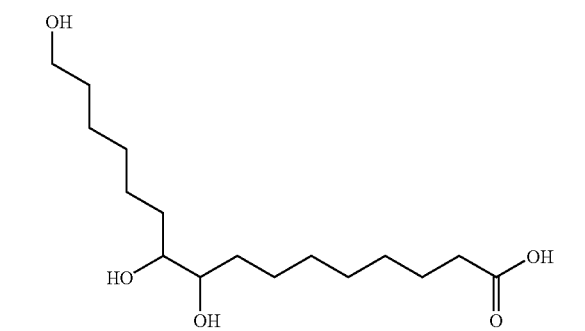

Formula (1)

or shelloic acid of Formula 2

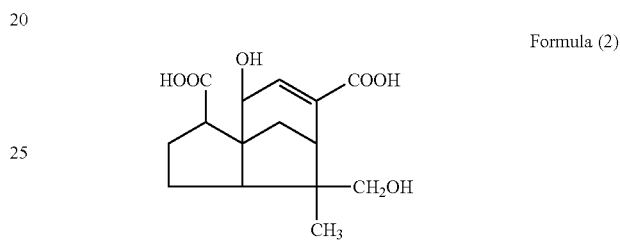

Formula (2)

or a mixture thereof and extruding the polyolefin and nucleating agent at a temperature that is at least the melting point of the polyolefin to obtain the nucleated polyolefin.

3. A process as claimed in claim 2 wherein the polyolefin is selected from the group consisting of polyolefin polymers of an aliphatic olefin and copolymers containing at least one aliphatic olefin and one or more ethylenically unsaturated comonomers.

4. A process as claimed in claim 3 wherein the one or more comonomers is present in an amount of 10% or less based on the weight of olefin.

5. A process as claimed in claim 2 wherein the polyolefin is selected from the group consisting of polyethylene, polypropylene and ethylene-propylene copolymers.

6. A process as claimed in claim 2 wherein the nucleating agent is obtained by neutralizing the aleuritic or shelloic acids with an alkali metal hydroxide followed by removal of water under reduced pressure at a temperature of about 80° C. followed by further drying at about 120° C. under reduced pressure.

7. A process as claimed in claim 2 wherein the nucleating agent is prepared by treating neutral aqueous solution of alkali salts of aleuritic or shelloic acids with a equimolar solutions of alkaline earth chlorides, washing the salts with water and drying at 120° C. under reduced pressure and isolating the salts by removal of water and grinding the salts in mortar and pestle.

8. A process as claimed in claim 2 wherein the metal salt comprises a salt of sodium, potassium, lithium, calcium.

9. A process as claimed in claim 2 wherein the quantity of nucleating agent used in polyolefin is not less than 0.2% w/w based on polyolefin.

* * * * *